United States Patent
Bandyopadhyay et al.

(10) Patent No.: US 9,513,848 B2
(45) Date of Patent: Dec. 6, 2016

(54) STORAGE AND ACCESS OF JOB TICKET VALUES

(71) Applicants: Aritra Bandyopadhyay, Boulder, CO (US); David Ward, Broomfield, CO (US)

(72) Inventors: Aritra Bandyopadhyay, Boulder, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/596,413

(22) Filed: Jan. 14, 2015

(65) Prior Publication Data
US 2016/0202938 A1    Jul. 14, 2016

(51) Int. Cl.
*G06F 15/00*    (2006.01)
*G06F 3/12*    (2006.01)

(52) U.S. Cl.
CPC ........... *G06F 3/1205* (2013.01); *G06F 3/1241* (2013.01)

(58) Field of Classification Search
CPC ............................ G06F 3/1205; G06F 3/1241
USPC ...................... 358/1.15, 1.16, 1.17
See application file for complete search history.

(56) References Cited

U.S. PATENT DOCUMENTS

| | | | |
|---|---|---|---|
| 6,134,018 A | 10/2000 | Dziesietnik et al. | |
| 7,114,032 B2 | 9/2006 | Challenger et al. | |
| 7,471,401 B2 * | 12/2008 | Saito | H04N 1/32144 283/113 |
| 7,515,297 B2 * | 4/2009 | Wardell | G06K 15/00 358/1.16 |
| 7,796,295 B2 | 9/2010 | Kudo et al. | |
| 8,860,959 B2 * | 10/2014 | Sakura | G06F 3/1205 358/1.13 |
| 8,860,990 B2 * | 10/2014 | Yoshimura | G06F 3/1205 358/1.15 |
| 2011/0194142 A1 | 8/2011 | Wakana | |
| 2012/0243032 A1 | 9/2012 | Hayakawa | |
| 2013/0258378 A1 | 10/2013 | Isoguchi et al. | |
| 2014/0085657 A1 | 3/2014 | Segawa et al. | |

OTHER PUBLICATIONS

Meneguzzi, F.R.; Meirelles, Leonardo Luceiro; Mano, Fernando Tarlá; Martins; Silva, Ana Cristina Benso; Oliveira, João Batista Souza. Strategies for Document Optimization in Digital Publishing. In: Proceedings of the 2004 ACM Symposium on Document Engineering, Milwaukee, 2004.

* cited by examiner

*Primary Examiner* — Tammy Pham
*Assistant Examiner* — Mark Milia
(74) *Attorney, Agent, or Firm* — Duft Bornsen & Fettig LLP

(57) ABSTRACT

System and methods for storage and access of job ticket values. In one embodiment, an apparatus includes a job ticket controller that receives a print job and an associated job ticket, and processes the job ticket to identify a group of logical pages that share common attribute values. The job ticket controller caches a shared copy of the attribute values in memory for the group, and identifies static attribute values and dynamic attribute values in the shared copy. Responsive to a request to update a dynamic attribute value of a logical page that belongs to the group, the job ticket controller copies the dynamic attribute values to a separate copy, performs the update, and then provides the separate copy and the static attribute values of the shared copy in response to a request of attribute information of the logical page.

15 Claims, 6 Drawing Sheets

STORAGE AND ACCESS OF JOB TICKET VALUES

FIELD OF THE INVENTION

The invention relates to the field of printing systems, and in particular, to storing and accessing job ticket values for a print job.

BACKGROUND

A print shop typically includes a number of high-volume printers capable of printing incoming print jobs quickly and at high quality. The print shop may be managed by a print server that receives raw print jobs from a host and converts the raw print jobs into a series of rasterized images that a print engine may use for physically marking media.

In general, the host, or a user of the host, is able to instruct the print server to rasterize the logical pages of a print job in a certain format with a job ticket. The job ticket includes attribute information that designates, for example, a particular media size (e.g., A4 or letter size), plex (e.g., single-sided or double-sided), or other attribute for a page, or range of pages, in the print job.

The print server uses attribute values of the job ticket in the process of converting the raw print job into properly formatted rasterized page images. It is therefore desirable to manage attribute information of job tickets effectively to efficiently process print jobs.

SUMMARY

Embodiments described herein provide for efficient storage and access of job ticket values. A job ticket controller of a print server reads attribute information for one page in a received job ticket and identifies multiple pages in the print job that share attribute information. One cache item is created in memory to represent of the attribute information for the group of similar pages. When a rasterizer requests attribute information for one, or any, of the pages during processing of the print job, the cache item is provided to satisfy the request. When a rasterizer requests to update attribute information for one, or any, of the pages during processing of the print job, expansion of memory to perform the update is minimal, and the cache item may still be reused, at least in part, to respond to subsequent requests for attribute information for any pages in the group. Thus the job ticket controller reduces the number of read operations of a job ticket to improve processing speed, and provides access to attribute information for each page in the print job quickly from cache. The job ticket controller also stores attribute values in a condensed manner to reduce print job processing inefficiencies associated with unrestrained growth in memory usage.

One embodiment is an apparatus that includes a job ticket controller that receives a print job and an associated job ticket, and processes the job ticket to identify a group of logical pages that share common attribute values. The job ticket controller also caches a shared copy of the attribute values in memory for the group, and identifies static attribute values and dynamic attribute values in the shared copy. The job ticket controller further detects a request to update a dynamic attribute value of a logical page that belongs to the group, copies the dynamic attribute values in the shared copy to a separate copy in the memory, and performs the update to the dynamic attribute value in the separate copy. In response to a request to read attribute information of the logical page, the job ticket controller provides the separate copy and the static attribute values of the shared copy.

The above summary provides a basic understanding of some aspects of the specification. This summary is not an extensive overview of the specification. It is not intended to identify key or critical elements of the specification nor to delineate any scope of particular embodiments of the specification, or any scope of the claims. Its sole purpose is to present some concepts of the specification in a simplified form as a prelude to the more detailed description that is presented later. Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
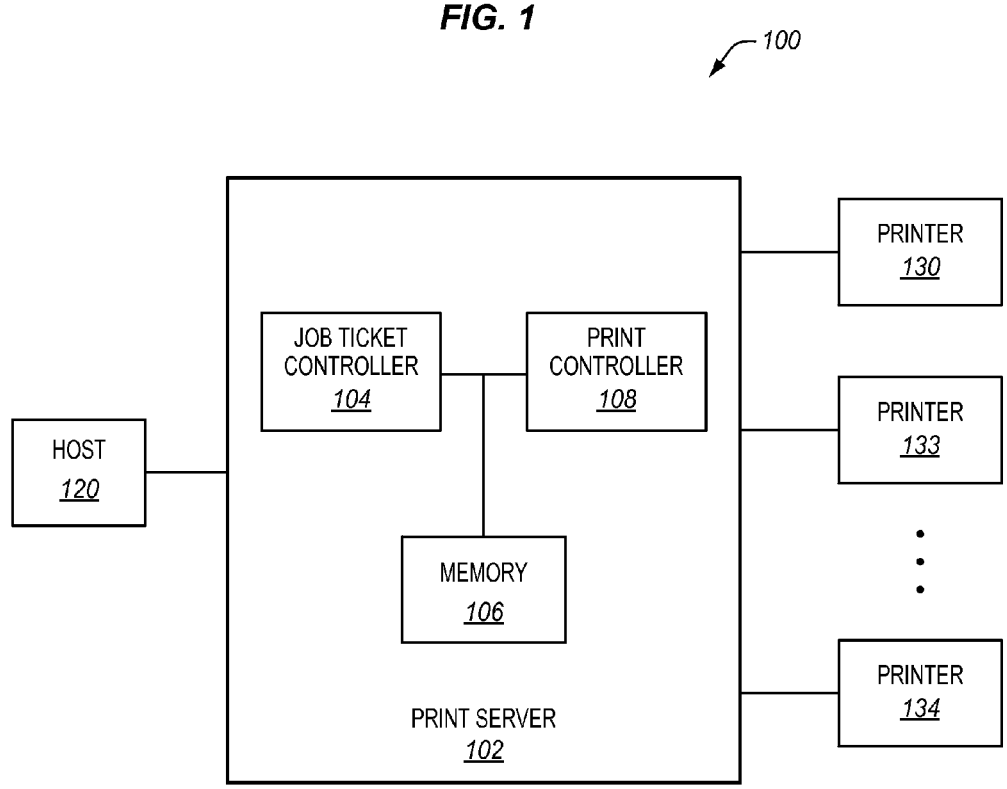
FIG. 1 is a block diagram of a print shop architecture in an exemplary embodiment.

FIG. 1 is a block diagram of a print shop architecture 100 in an exemplary embodiment. Print shop architecture includes print server 102 that is any system, component, or device that is configured to receive print jobs from one or more host(s) 120 and to schedule the print jobs with printers 130-134. Printers 130-134 generally include systems for transforming print data of the print jobs onto a suitable printable medium, such as paper, and may include large production printing systems for high volume printing.

A print job may include raw print data in a page description format such as PDL, Printer Control Language (PCL), PostScript data, etc. The print job may also include, or be accompanied with, a job ticket. A job ticket is any data that defines how a print job is to be processed. For example, a job ticket may include attribute information for the type of media to use (e.g., A4, media bin, color, etc.), the size and/or formatting of pages on the media (e.g., duplex, N-up configurations, image/text alignment), the type of finishing, etc. The attribute information in the job ticket may therefore define how print server 102 processes a print job, or a set of pages within the print job, for printing on printers 130-134.

Print server 102 includes job ticket controller 104, memory 106, and print controller 108. When host 120 sends print jobs and job tickets to print server 102, the job tickets are copied into memory 106, which is any storage medium suitable for caching attribute information of a job ticket, such as random access memory (RAM), dynamic RAM (DRAM), or other suitable forms of data storage. Print controller 108 is any system, component, or device configured to convert print jobs into rasterized data for physical marking with printers 130-134. As such, print controller 108 may include a number of processing steps/components to perform data processing operations such as interpretation, preflight operations, color management, imposition, rasterization, etc. Each of the data processing operation of print controller 108 may request and acquire the attribute information for a specific logical page, process that logical page using the attribute information, and repeat until eventually each page of the print job is properly rendered as requested in the job ticket.

In previous systems, a read operation is performed on the job ticket for each logical page in the print job, and a separate memory item is created in memory for each individual page. Though a job ticket may be stored to avoid repeatedly performing inefficient reads on the tree structure of the job ticket during print job processing, a separate read operation on the job ticket's tree structure is still performed for each page of the print job. Thus, even if two pages are identical, a separate read operation is performed on the job ticket's tree structure for the attributes of each page and a separate copy of the attributes is maintained for each of the identical pages. As a result, a high number of read operations are performed during processing of the print job and the memory footprint to accommodate storage of attributes is quite large. These inefficiencies may be compounded for systems that routinely receive large print jobs with thousands of logical pages. Furthermore, prior systems maintain a separate cache item or separate copy of attribute information in memory for each logical page of the print job, so that when attribute information for a page is written/updated during processing of the print job, all attributes for the affected page are copied into a newly allocated memory space. The memory space that stores job ticket attribute information is therefore prone to unrestrained growth of memory usage which may cause inefficiencies in processing print jobs and which often worsen over time as memory usage grows.

Print server 102 is therefore enhanced with job ticket controller 104 which is any system, component, or device configured to receive a job ticket, and to manage storage/retrieval of attribute information of the job ticket in memory 106. Job ticket controller 104 implements a caching scheme of job ticket attribute information that reduces read operations performed on a job ticket and the amount of job ticket information stored in memory 106 while managing requests to read, write, and update attribute values during the course of processing a print job in print server 102.

In one embodiment, job ticket controller 104 detects and manages requests from print controller 108 to read attribute information of a job ticket. For instance, during rasterization, print controller 108 may iteratively request, obtain, and process logical pages in a certain order of the print job using attribute values of the associated job ticket. Job ticket controller 104 identifies and retrieves content in memory 106 that corresponds to information for the requested logical page.

In another embodiment, job ticket controller 104 detects and manages requests from print controller 108 to update, write, or otherwise modify attribute information of a job ticket. An attribute for a logical page may be updated during processing of the print job for a variety of reasons. For example, a rasterizer of print controller 108 may consider the size, type, weight, finish, and other properties of media that a print job is ultimately printed on. The rasterizer may use information regarding the properties of the media when generating bitmap data so that the bitmap data is tailored to the media. In doing so, print controller 108 and/or a print operator of print server 102 may request modification of an attribute value of a logical page in the print job. In response to detecting such a request, job ticket controller 104 identifies content in memory 106 that corresponds to information of the logical page affected by the update, and manages the update operation in memory 106.

In yet another embodiment, job ticket controller 104 is configured to categorize attribute information of a job ticket into dynamic attributes and static attributes. Dynamic attributes are subject to change during processing of the print job and static attributes remain unchanged during the processing of the print job. For example, in addition to formatting instructions such as page size, rotation, etc., a job ticket may include job information (e.g., document name, title, author, etc.) that remains constant during processing of the print job. Job ticket controller 104 may therefore be configured to access or obtain definitions/rules/logic for classifying types of attribute information as being dynamic or static. It will be appreciated that dynamic and static values may be defined or classified in a variety of ways by matter of design choice (e.g., user/operator set, designated in a job ticket, stored as default rules in print server 102, etc.).

Figure 2:
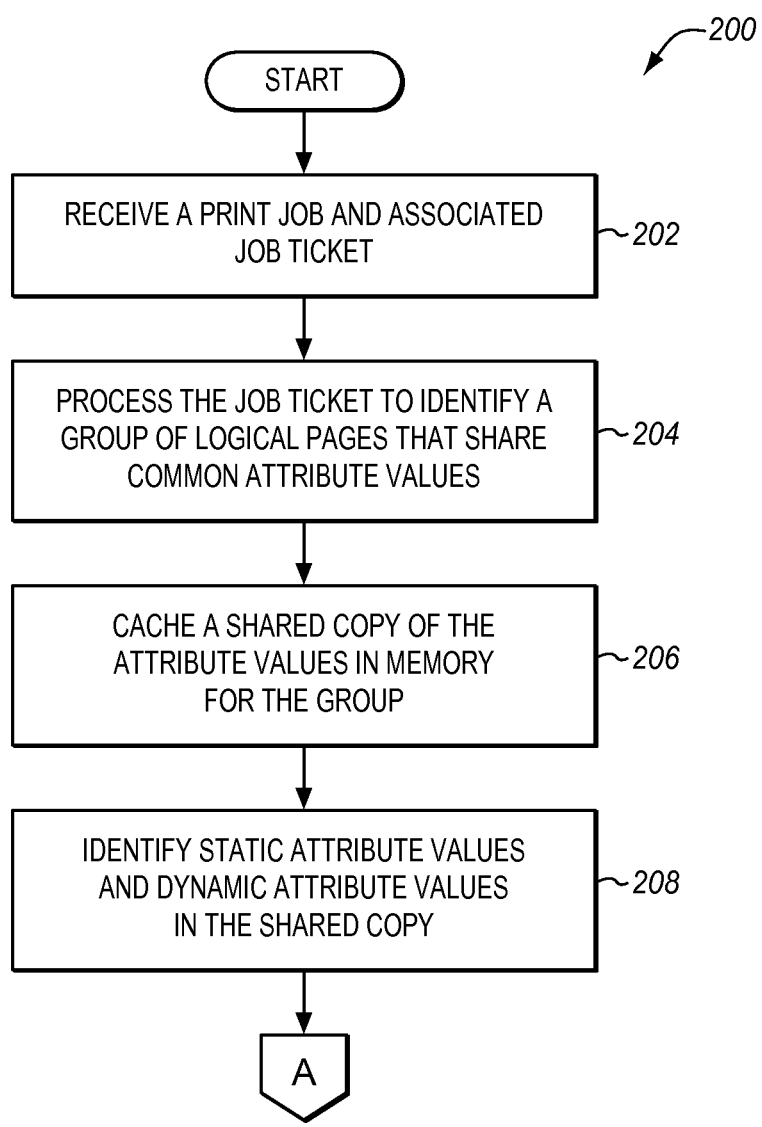
FIG. 2 is a flow chart illustrating a method for storing job ticket attribute information in an exemplary embodiment.

FIG. 2 is a flow chart illustrating a method 200 for storing job ticket attribute information in an exemplary embodiment. The steps of the method 200 will be described with respect to print shop architecture 100 of FIG. 1, although one skilled in the art will understand that method 200 may be performed by other systems not shown. The steps of the flow charts shown and described herein are not all inclusive and may include other steps not shown. Additionally, steps for the flow charts shown and described herein may also be performed in alternative orders.

At step 202, job ticket controller 104 receives a print job and an associated job ticket. At step 204, job ticket controller 104 processes the job ticket to identify a group of logical pages that share common attribute values. At step 206, job ticket controller 104 caches a shared copy of the attribute values in memory 106 for the group. And, at step 208, job ticket controller 104 identifies static attribute values and dynamic attribute values in the shared copy.

In method 200, job ticket controller 104 may read the job ticket for attribute information of a single page and determine that other page(s) in the print job share identical attribute information based on analysis of the job structure. For example, for a print job that includes 10 pages with a job ticket that indicates an exception only for page 6, job ticket controller 104 may parse the job ticket for attribute values of page 1 of the print job and determine that pages 2-5 and 7-10 have identical attribute information since only page 6 is identified with an exception in the print job. Job ticket controller 104 may therefore avoid reading the job ticket for attribute information of pages 2-5 and 7-10 but nonetheless store attribute information for each of pages 1-5 and 7-10 in a single cache item.

Figure 3:
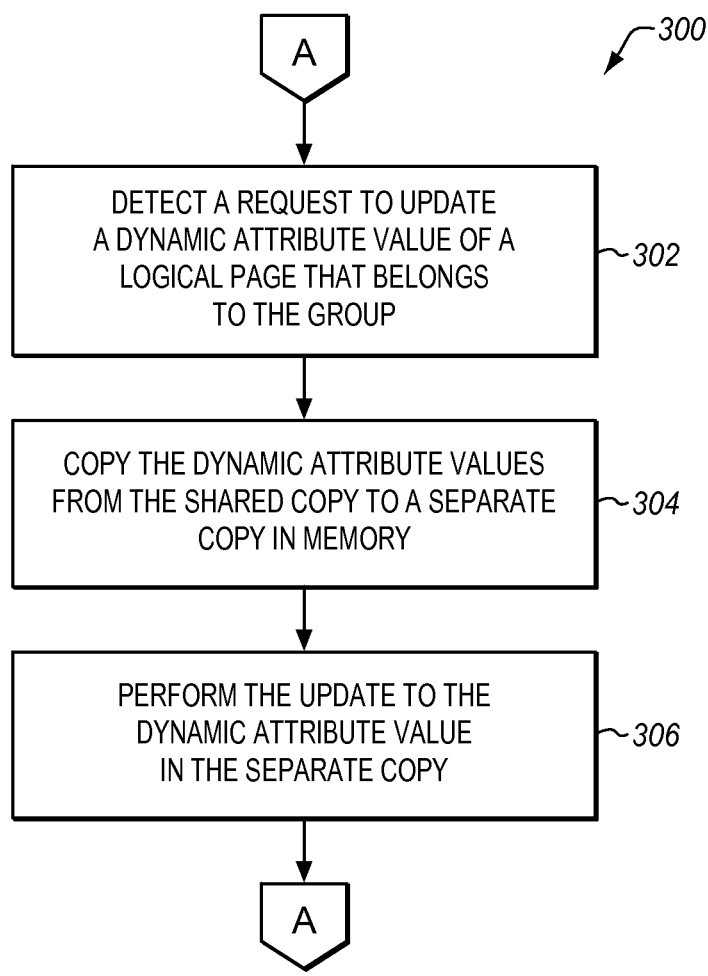
FIG. 3 is a flow chart illustrating a method for updating stored job ticket attribute information in an exemplary embodiment.

FIG. 3 is a flow chart illustrating a method 300 for updating stored job ticket attribute information in an exemplary embodiment. The steps of the method 300 will be described with respect to print shop architecture 100 of FIG. 1, although one skilled in the art will understand that method 300 may also be performed by other systems not shown.

At step 302, job ticket controller 104 detects a request to update a dynamic attribute value of a logical page that belongs to the group (e.g., the group established in step 204). At step 304, job ticket controller 104 copies the dynamic attribute values from the shared copy to a separate copy in memory 106. At step 306, job ticket controller 104 performs the update to the dynamic attribute value in the separate copy.

In method 300, job ticket controller 104 may create a page-specific cache item in memory 106 to update attribute information for one logical page in a group without affecting attribute information for other logical pages in the group. Job ticket controller 104 may perform the update with minimal growth of attribute information in memory 106 since the page-specific cache item is limited to attribute values for the page that may change during processing of the print job (e.g., dynamic attribute values).

Figure 4:
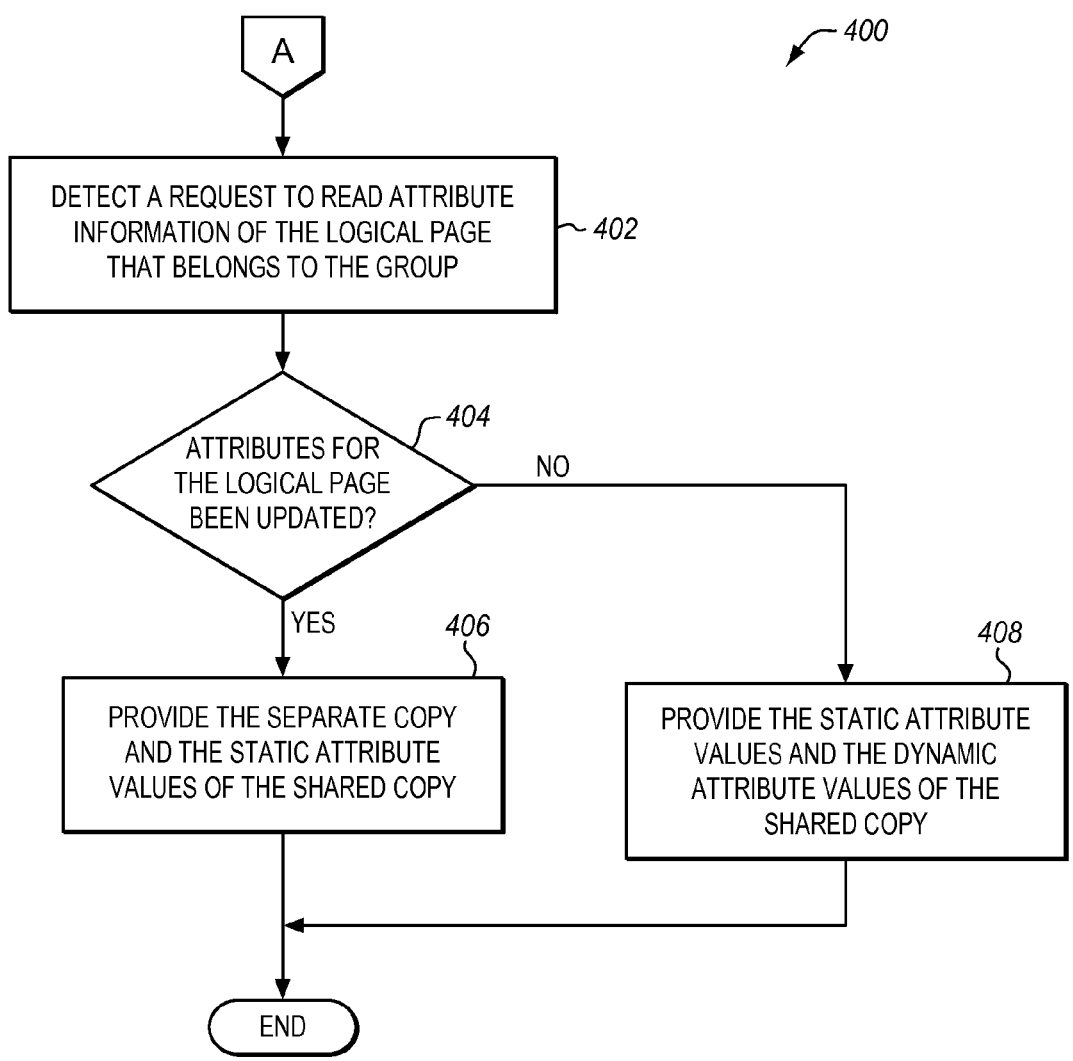
FIG. 4 is a flow chart illustrating a method for retrieving stored job ticket attribute information in an exemplary embodiment.

FIG. 4 is a flow chart illustrating a method 400 for retrieving stored job ticket attribute information in an exemplary embodiment. The steps of the method 400 will be described with respect to print shop architecture 100 of FIG. 1, although one skilled in the art will understand that method 300 may also be performed by other systems not shown.

At step 402, job ticket controller 104 detects a request to read attribute information of a logical page in the group (e.g., the group established in step 204). At step 404, job ticket controller 104 determines whether attributes for the logical page have updated during processing of the print job (e.g., determines whether steps 302-306 were performed for the logical page of the read request). In response to a determination that attributes for the logical page have updated during processing of the print job, method 400 proceeds to step 406 and job ticket controller 104 responds to the read request by providing the separate copy for the logical page and the static attribute values of the shared copy. Otherwise, in response to a determination that attributes for the logical have not updated during processing of the print job, method 400 proceeds to step 408 and job ticket controller 104 responds to the read request by providing the static attribute value and the dynamic attribute values of the shared copy.

Using one or more of the methods described above, job ticket controller 104 may maintain a single cache item to be used for any of multiple logical pages belonging to the group. For example, in response to a read request from a rasterizer of printer controller 108 for attribute information for a page in the group that has not been updated, job ticket controller 104 returns the single cache item from memory 106 as opposed to creating new cache items for each page. Therefore, job ticket controller 104 minimizes read operations of the job ticket, reduces footprint of memory 106, and supports efficient read operations of attribute information stored in memory 106 to minimize delay when print controller 108 requests attribute information for a page to carry out a processing task.

Moreover, using one or more of the methods described above, job ticket controller 104 may handle subsequent read requests for attribute values that have been updated without performing an inefficient read operation on the job ticket and while maintaining the benefits of a reduced footprint of memory 106. For example, in response to a read request from a rasterizer of printer controller 108 for attribute information for a page in the group that has been updated, job ticket controller 104 returns a portion of the single cache item (e.g., the uncopied static attribute values in the shared copy), while also accurately reflecting the update with return of the separate copy (e.g., the copied dynamic attribute values updated in the separate copy).

In one embodiment, job ticket controller 104 classifies the common attributes of a group of logical pages stored in a shared cache item of memory 106 into static attributes and dynamic attributes. Job ticket controller 104 creates a "group cache" that represents identical attribute values (e.g., static and dynamic) for a group of logical pages, and provides the group cache in response to a read request from print controller 108 for a logical page of the group with attribute values unmodified/unwritten during processing of the print job. Job ticket controller 104 may also create a "page cache" that represents attribute values for a particular page. In response to a write/update to attribute information for a logical page that belongs to the group, job ticket controller 104 copies the dynamic values from the group cache into the page cache and performs the write/update operation in the page cache. In response to a read request from print controller 108 for that logical page in the group with attribute values modified/written, job ticket controller 104 provides the static attributes in the group cache, and the dynamic attributes in the page cache. Thus, job ticket controller 104 may avoid duplicating attribute values for a page that do not change during processing of the print job (thereby promoting slow growth of memory 106), yet still efficiently provide access to a page's attribute values to print controller 108.

In another embodiment, job ticket controller 104 caches a shared copy of the attribute values in memory 106 for the group in response to a read/write request for a page in the group. Job ticket controller 104 determines which groups of similar pages exist after the job ticket is received but does not create the group in cache until a read/write request for a page in the group is obtained. In response to a read/write request for attributes of a page, job ticket controller 104 reads the job ticket and creates the group cache in memory. As such, it is possible that attributes for some pages are not read and/or cached if a read/update request for the page is not obtained during processing of the print job.

In yet another embodiment, job ticket controller 104 creates a page cache for special pages in the print job, such as insert sheets or banner pages. In a further embodiment, job ticket controller 104 is configured to detect and ignore update operations that ultimately do not change an attribute value, thereby preventing unnecessary growth of memory 106. In yet another embodiment, job ticket controller 104 creates a separate page cache for a logical page in the print job only if that page is updated at least once during processing of the print job. It will be appreciated that job ticket controller 104, print controller 108, and memory 106 and features of each may be incorporated with one another or combined in a variety of ways other than as shown or described herein. It will further be appreciated that print shop architecture 100 and print server 102 may include additional components not shown for the sake of brevity. For example, print controller 108 may include multiple processing components/steps to processing print jobs simultaneously and/or in parallel fashion. The concepts and features described above may also apply to attribute information related to equipment/systems of print shop architecture 100 other than printers 130-134, such as post-print handling equipment.

EXAMPLES

Figure 5:
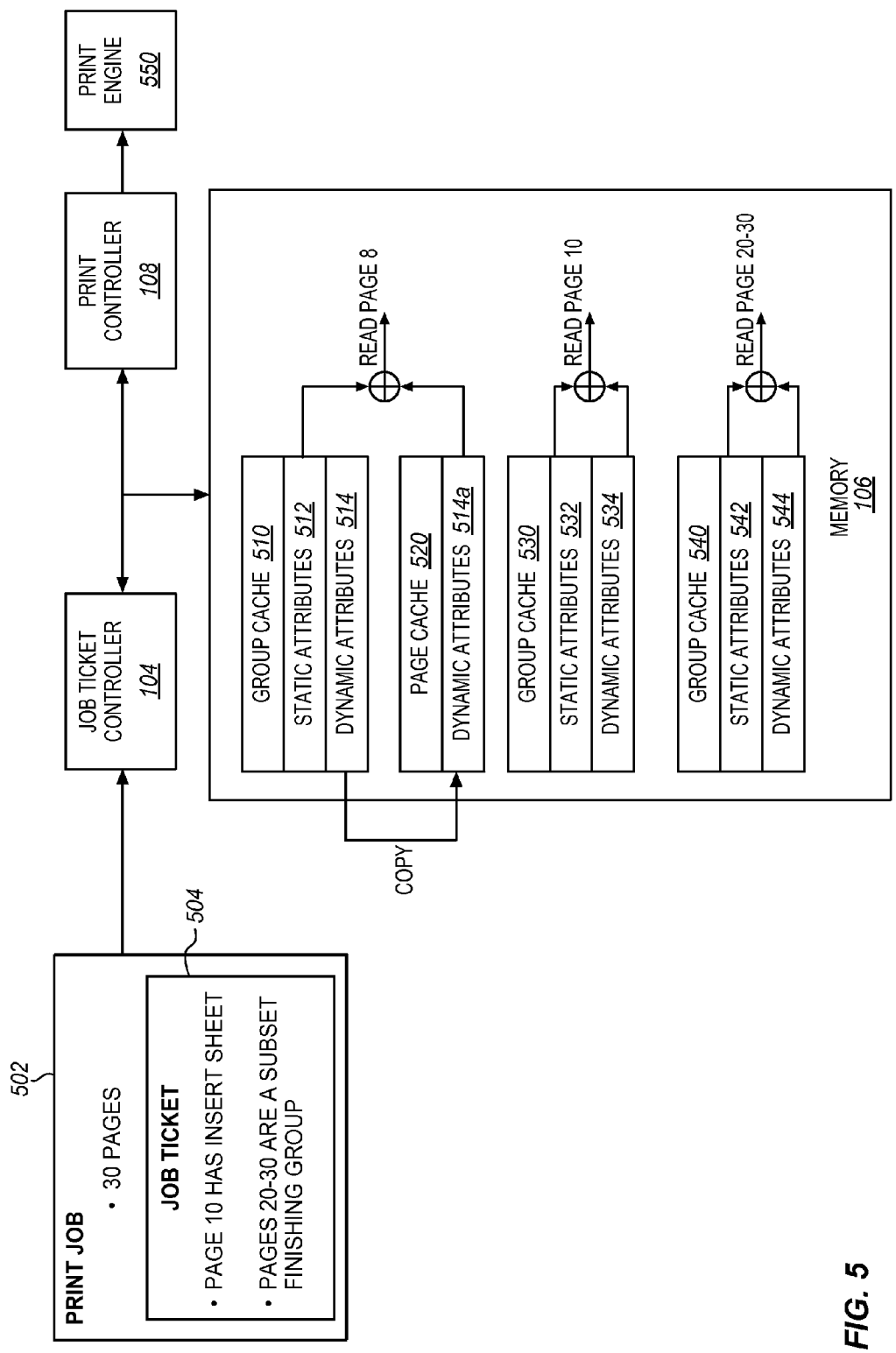
FIG. 5 illustrates an example of storing and accessing a particular job ticket in a print shop.

FIG. 5 illustrates an example of storing and accessing a particular job ticket in a print shop. In this example, job ticket controller 104 receives print job 502 and job ticket 504. Print job 502 includes thirty logical pages and job ticket 504 specifies that page 10 has an insert sheet attached and pages 20-30 comprise a subset finishing group.

Job ticket controller 104 reads job ticket 504 for attributes of page 1. In doing so, job ticket controller 104 determines that pages 2-9 and 11-19 have identical attribute information since they are not associated with any exceptions in job ticket 504. Thus, job ticket controller 104 creates group cache 510 and classifies the attributes of pages 1-9 and 11-19 into static attributes 512 and dynamic attributes 514. Assuming there are no intervening update/write operations, job ticket controller 104 may subsequently serve read requests from print controller 108 for any of pages 1-9 or 11-19 by returning static attributes 512 and dynamic attributes 514 of group cache 510. Thus, job ticket controller 104 provides group cache 510 in response to read requests by print controller 108 for attribute information for any of pages 1-9 and 11-20, with one read operation for attribute values in the job ticket 504.

However, further assume for this example that, at some point during processing of print job 202, print controller 108 requests to perform an update to attribute information of page 8. In response, job ticket controller 104 creates page cache 520 and copies dynamic attributes 514 of group cache 510 into page cache 520. Job ticket controller 104 performs the update in page cache 520 to store updated dynamic attributes 514a. Job ticket controller 104 returns the sum of static attributes 512 of group cache 510 and dynamic attributes 514a of page cache 520 in response to any subsequent read for attribute information of page 8 by print controller 108. Thus, job ticket controller 104 updates attribute information for page 8 with minimal increase in memory usage and without performing a read operation on job ticket 504. And, all attribute information relevant to page 8, including attribute(s) which have been updated, are made readily available to print controller 108 via quick accesses to memory 106.

Next, job ticket controller 104 reads job ticket 504 for attributes of page 10. Page 10 includes an insert sheet in this example. Thus, attributes for page 10 are not the same as the attributes for pages 1-9 and 11-19, and job ticket controller 104 creates a new group cache 530 with static attributes 532 and dynamic attributes 534 for page 10. Job ticket controller 104 returns static attributes 532 and dynamic attributes 534 of group cache 530 in response to any subsequent read for attribute information of page 10 by print controller 108.

Then, job ticket controller 104 reads job ticket 504 for attributes of page 20. Job ticket controller 104 determines that page 20 belongs to an exception and creates group cache 540 with static attributes 542 and dynamic attributes 544 of page 20. Job ticket controller 104 avoids creating an exclusive page cache for page 20 unless there happens to be an update/write to an attribute for page 20 at a subsequent time. Therefore, job ticket controller 104 returns static attributes 542 and dynamic attributes 544 of group cache 540 in response to any subsequent read for attribute information of page 20 by print controller 108.

When job ticket controller 104 analyzed the exceptions specified in the job ticket 504, it determined that pages 20-30 share attribute information. Thus, when job ticket controller 104 reads job ticket 504 for attributes of page 20 and creates group cache 540, job ticket controller 104 links pages 21-30 to the group cache 540. Therefore, job ticket controller 104 may perform a single read on job ticket 504 to create and service requests by print controller 108 for attribute information of any of pages 20-30. After print controller 108 rasterizes logical pages using information obtained from memory 106 as described above, it sends the rasterized logical pages to print engine 550 for physical printing.

To illustrate the advantages of job ticket controller 104, consider the total number of job ticket reads and the total number of cache items stored in this example compared with prior caching schemes. Job ticket controller 104 reads job ticket 504 a total of three times (e.g., for pages 1, 10, and 20), and creates four cache items (e.g., group cache 510, page cache 520, group cache 530, and group cache 540). In contrast, a prior system that reads the job ticket for each page and maintains a separate cache item for each page, reads job ticket 504 thirty times (once for each page in print job 502) and creates at least thirty cache items (again, once for each page in print job 502 but possibly more for writes/updates). Thus, job ticket controller 104 reduces job ticket reads and memory usage for storing job ticket information, and increases computational efficiency compared with prior schemes.

Figure 6:
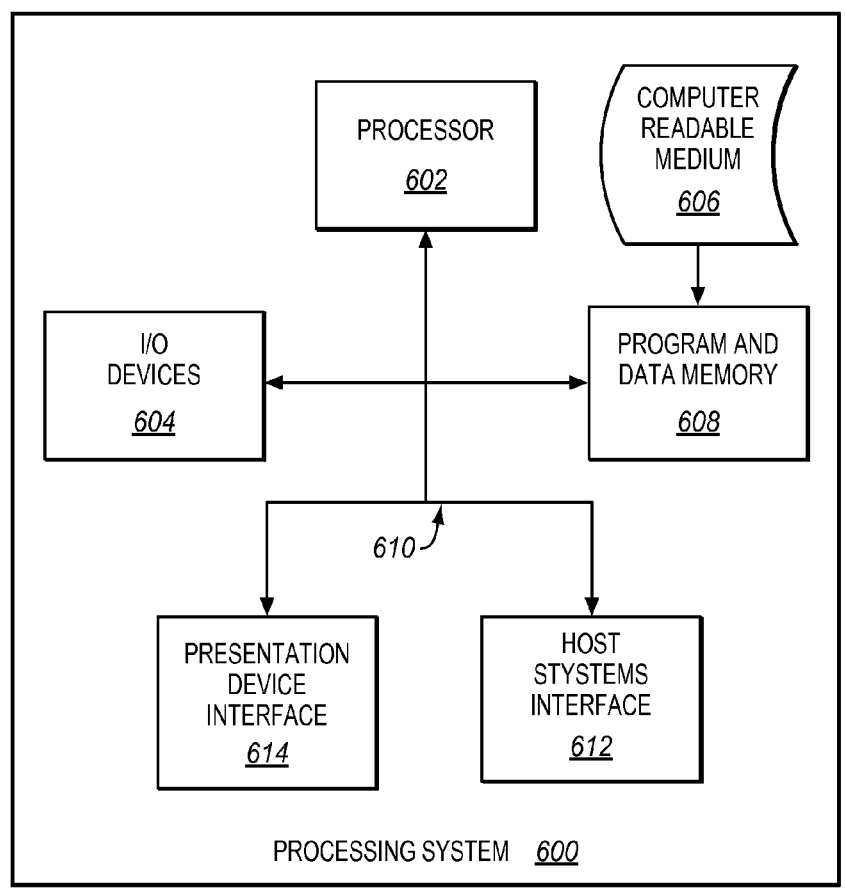
FIG. 6 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct processing system(s) of print server 102 to perform the various operations disclosed herein. FIG. 6 illustrates a processing system 600 configured to execute a computer readable medium embodying programmed instructions to perform desired functions in an exemplary embodiment. Processing system 600 is configured to perform the above operations by executing programmed instructions tangibly embodied on computer readable medium 606. In this regard, embodiments can take the form of a computer program accessible via computer readable medium 606 providing program code for use by a computer or any other instruction execution system. For the purposes of this description, computer readable medium 606 may be anything that contains or stores the program for use by the computer.

Computer readable medium 606 can be an electronic, magnetic, optical, electromagnetic, infrared, or semiconductor device. Examples of computer readable medium 606 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. Processing system 600, being suitable for storing and/or executing the program code, includes at least one processor 602 coupled to program and data memory 608 through a system bus 610. Program and data memory 608 may include local memory employed during actual execution of the program code, bulk storage, and cache memories that provide temporary storage of at least some program code and/or data in order to reduce the number of times the code and/or data are retrieved from bulk storage during execution.

Input/output or I/O devices 604 (including but not limited to keyboards, displays, pointing devices, etc.) may be coupled either directly or through intervening I/O controllers. Host system interfaces 612 may also be integrated with the system to enable processing system 600 to become coupled to other data processing systems or storage devices through intervening private or public networks. Modems, cable modems, SCSI, Fibre Channel, and Ethernet cards are just a few of the currently available types of network or host interface adapters. Presentation device interface 614 may be integrated with the system to interface to one or more presentation devices, such as printing systems and displays for presentation of presentation data generated by processor 602. Although specific embodiments were described herein, the scope of the inventive concept(s) is not limited to those specific embodiments. The scope of the inventive concept(s) is defined by the following claims and any equivalents thereof.

We claim:

1. An apparatus comprising:
a job ticket controller configured to receive a print job and an associated job ticket, to process the job ticket to identify a group of logical pages that share common attribute values, to cache a shared copy of the common attribute values in memory, and to identify static attribute values and dynamic attribute values among the common attribute values, wherein the static attribute values remain unchanged during processing to prepare the print job for printing, and the dynamic attribute values are subject to change during processing to prepare the print job for printing;
the job ticket controller is configured to detect a request to update a dynamic attribute value of a logical page with the common attribute values during processing to prepare the print job for printing, to copy the dynamic attribute values of the common attribute values in the shared copy to a separate copy in the memory in response to the request to update, to perform the update to the dynamic attribute value in the separate copy, and, responsive to a request to read attribute information of the logical page during processing to prepare the print job for printing, to provide the common attribute values by providing the dynamic attribute values from the separate copy and providing the static attribute values from the shared copy.

2. The apparatus of claim 1 wherein:
responsive to a request to read attribute information of another logical page in the group with unmodified attribute values, the job ticket controller is configured to provide the common attribute values by providing the static attribute values from the shared copy and providing the dynamic attribute values from the shared copy.

3. The apparatus of claim 1 wherein:
the job ticket controller is configured to perform a read operation of the job ticket for one page, to identify the group of logical pages that share the common attribute values with the one page based on exceptions in the job ticket, and to cache the shared copy of the common attribute values to represent each of the logical pages of the group without performing read operations of the job ticket for the common attribute values of other pages in the group.

4. The apparatus of claim 1 wherein:
responsive to a request for attribute information for one or more logical pages in the group, the job ticket controller is configured to determine whether the common attribute values for the one or more logical pages have updated during processing of the print job.

5. The apparatus of claim 4 wherein:
responsive to a determination that the common attribute values for the one or more logical pages have updated, the job ticket controller is configured to provide the separate copy that includes updated dynamic attribute values, and to provide the static attribute values of the shared copy; and
responsive to a determination that the common attribute values for the one or more logical pages have not updated, the job ticket controller is configured to provide the static attribute values of the shared copy and the dynamic attribute values of the shared copy.

6. A method comprising:
receiving a print job and an associated job ticket;
processing the job ticket to identify a group of logical pages that share common attribute values;
caching a shared copy of the common attribute values in memory;
identifying static attribute values and dynamic attribute values among the common attribute values, wherein the static attribute values remain unchanged during processing to prepare the print job for printing, and the dynamic attribute values are subject to change during processing to prepare the print job for printing;
detecting a request to update a dynamic attribute value of a logical page with the common attribute values during processing to prepare the print job for printing;
copying the dynamic attribute values of the common attribute values in the shared copy to a separate copy in the memory in response to the request to update;
performing the update to the dynamic attribute value in the separate copy; and
in response to a request to read attribute information of the logical page during processing to prepare the print job for printing, providing the common attribute values by providing the dynamic attribute values from the separate copy and providing the static attribute values from the shared copy.

7. The method of claim 6 further comprising:
in response to a request to read attribute information of another logical page in the group with unmodified attribute values, providing the common attribute values by providing the static attribute values from the shared copy and providing the dynamic attribute values from the shared copy.

8. The method of claim 6 further comprising:
performing a read operation of the job ticket for one page;
identifying the group of logical pages that share the common attribute values with the one page based on exceptions in the job ticket; and
caching the shared copy of the common attribute values to represent each of the logical pages of the group without performing read operations of the job ticket for the common attribute values of other pages in the group.

9. The method of claim 6 further comprising:
in response to a request for attribute information for one or more logical pages in the group, determining whether the common attribute values for the one or more logical pages have updated during processing of the print job.

10. The method of claim 9 further comprising:
in response to determining that the common attribute values for the one or more logical pages have updated, providing the separate copy that includes updated dynamic attribute values, and providing the static attribute values of the shared copy; and
in response to determining that the common attribute values for the one or more logical pages have not updated, providing the static attribute values of the shared copy and the dynamic attribute values of the shared copy.

11. A non-transitory computer readable medium embodying programmed instructions, which, when executed by a processor, are operable for performing a method comprising:

receiving a print job and an associated job ticket;

processing the job ticket to identify a group of logical pages that share common attribute values;

caching a shared copy of the common attribute values in memory;

identifying static attribute values and dynamic attribute values among the common attribute values, wherein the static attribute values remain unchanged during processing to prepare the print job for printing, and the dynamic attribute values are subject to change during processing to prepare the print job for printing;

detecting a request to update a dynamic attribute value of a logical page with the common attribute values during the processing to prepare the print job for printing;

copying the dynamic attribute values of the common attribute values in the shared copy to a separate copy in the memory in response to the request to update;

performing the update to the dynamic attribute value in the separate copy; and in response to a request to read attribute information of the logical page during the processing to prepare the print job for printing, providing the common attribute values by providing the dynamic attribute values from the separate copy and providing the static attribute values from the shared copy.

12. The medium of claim 11, wherein the method further comprises:

in response to a request to read attribute information of another logical page in the group with unmodified attribute values, providing the common attribute values by providing the static attribute values from the shared copy and providing the dynamic attribute values from the shared copy.

13. The medium of claim 11, wherein the method further comprises:

performing a read operation of the job ticket for one page;

identifying the group of logical pages that share the common attribute values with the one page based on exceptions in the job ticket; and caching the shared copy of the common attribute values to represent each of the logical pages of the group without performing read operations of the job ticket for the common attribute values of other pages in the group.

14. The medium of claim 11, wherein the method further comprises:

in response to a request for attribute information for one or more logical pages in the group, determining whether the common attribute values for the one or more logical pages have updated during processing of the print job.

15. The medium of claim 14, wherein the method further comprises:

in response to determining that the common attribute values for the one or more logical pages have updated, providing the separate copy that includes updated dynamic attribute values, and providing the static attribute values of the shared copy; and in response to determining that the common attribute values for the one or more logical pages have not updated, providing the static attribute values of the shared copy and the dynamic attribute values of the shared copy.

* * * * *